(12) United States Patent
Cho

(10) Patent No.: US 7,253,850 B2
(45) Date of Patent: Aug. 7, 2007

(54) LIQUID CRYSTAL DISPLAY DEVICE HAVING REDUNDANCY REPAIR PATTERN AND METHOD OF FORMING AND USING THE SAME

(75) Inventor: Ki-Sul Cho, Gyungsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/730,977

(22) Filed: Dec. 10, 2003

(65) Prior Publication Data

US 2004/0125259 A1    Jul. 1, 2004

(30) Foreign Application Priority Data

Dec. 31, 2002    (KR) ...................... 10-2002-0088466

(51) Int. Cl.
*G02F 1/1333*    (2006.01)
(52) U.S. Cl. ...................................... 349/54
(58) Field of Classification Search ........ 349/139–142, 349/54–55
See application file for complete search history.

(56) References Cited

U.S. PATENT DOCUMENTS 6,882,375 B2 *    4/2005    Kim ............................ 349/43

FOREIGN PATENT DOCUMENTS

KR    2002-0076937 A    10/2002
KR    2002078010    * 10/2002

* cited by examiner

*Primary Examiner*—Dung T. Nguyen
(74) *Attorney, Agent, or Firm*—Birch, Stewart, Kolasch & Birch, LLP

(57) ABSTRACT

A liquid crystal display device adopting a storage-on-common method is disclosed to prevent the operation of a unit pixel with a point deficiency, such as a brilliant spot, at its occurrence, thereby preventing degradation of a picture quality caused due to the defective pixel. Because the defective pixel is controlled to turn black by the use of a repair pattern, the picture quality degradation due to the defective pixel is prevented when the liquid crystal display device is driven.

9 Claims, 7 Drawing Sheets

LIQUID CRYSTAL DISPLAY DEVICE HAVING REDUNDANCY REPAIR PATTERN AND METHOD OF FORMING AND USING THE SAME

The present application claims, under 35 U.S.C. § 119, the priority benefit of Korean Patent Application No. 88466/2002 filed Dec. 31, 2002, the entire contents of which are herein fully incorporated by reference.

BACKGROUND OF THE INVENTION

1. Field of the Invention

The present invention relates to a technique for resolving a pixel deficiency of a liquid crystal display (LCD) device and, more particularly, to a technique for improving a pixel deficiency of a liquid crystal display device of a storage-on-common type.

2. Description of the Background Art

In general, a liquid crystal display device includes a thin film transistor TFT array substrate and a color filter substrate. The TFT array substrate includes a plurality of gate lines arranged in parallel in a line direction, a plurality of data lines arranged in a column direction and intersecting the gate lines, and TFTs formed at the intersection of the gate lines and the data lines. The color filter substrate has a plurality of color filters corresponding to unit pixels of the TFT array substrate. Liquid crystal is filled between the TFT array substrate and the color filter substrate.

The structure and operation of the TFT array substrate will now be described with reference to FIG. 1.

A TFT array substrate 100 is constructed with a plurality of gate lines 4 formed in a column direction on a substrate; a plurality of data lines 2 arranged in a line direction and intersecting the gate lines 4; a plurality of thin film transistors (T) each formed at the intersection of the corresponding gate line 4 and the corresponding data line 2; a plurality of pixel electrodes 14 each formed at a unit pixel region defined by the intersection of the corresponding gate line 4 and the corresponding data line 2; and a storage capacitor (not shown) for maintaining a signal applied from the data line for a predetermined time period.

A method of forming the storage capacitor in the liquid crystal display device generally involves forming a storage capacitor of a storage-on-gate type or forming a storage capacitor of a storage-on-common type.

The storage-on-gate structure involves a storage capacitor formed at a certain region of the gate line, while the storage-on-common structure involves a storage line formed in a liquid crystal cell and a storage capacitor formed at a certain region of the storage line.

The liquid crystal display device with the storage-on-common structure will now be described in detail with reference to the accompanying drawings.

FIG. 2 is a view showing a plane structure of a TFT array substrate of the liquid crystal display device with the storage-on-common structure.

With reference to FIG. 2, the gate lines 4 are arranged isolated in a vertical direction on the substrate, and the data lines 2 are arranged isolated in a horizontal direction. Accordingly, the gate lines 4 and the data lines 2 are arranged in a matrix form. A pixel region is defined by the intersection of the corresponding data line 2 and the corresponding gate line 4, and has a thin film transistor TFT and the pixel electrode 14. Storage lines 3 are provided between the gate lines 4 with a certain space therebetween and arranged in parallel to the gate lines 4.

Each thin film transistor TFT includes: a gate electrode 10 formed to protrude from a certain position of the gate line 4, a source electrode 8 extended from a certain position of the data line 2 and overlapping with the gate electrode 10 at its certain region, and a drain electrode 12 formed at a position corresponding to the source electrode 8 on the basis of the gate electrode 10. Accordingly, each TFT is formed at the intersection of the corresponding gate line 4 and the corresponding data line 2.

The pixel electrode 14 is formed at a portion of the pixel region of the liquid crystal cell where the TFT is not formed, and electrically contacts the drain electrode 12 through a drain contact hole 16 formed on the drain electrode 12 of the thin film transistor.

Accordingly, for each pixel region, the pixel electrode 14 and the corresponding storage line 3 overlap with each other with an insulation film (not shown) therebetween at the region where the storage line 3 of the liquid crystal cell is formed. This overlapping structure serves as a storage capacitor 18.

FIG. 3 is a sectional view taken along line I-I' of FIG. 2. A sectional structure of the TFT will now be described in detail with reference to FIG. 3.

The gate electrode 10 is formed on the substrate 1, and a gate insulation film 30 is formed over the entire surface of the substrate 1 including the gate electrode 10. The gate electrode 10 is formed to protrude in one direction from a certain position of the gate line 4.

An active layer 36 is formed such that a semiconductor layer 32 made of amorphous silicon is formed at an upper portion of the gate insulation film 30 and an ohmic contact layer 34 made of amorphous silicon doped with high density phosphor is deposited thereon.

The source electrode 8 and the drain electrode 12 are formed as isolated with a certain space therebetween and at the upper portion of the active layer 36, facing each other.

The ohmic contact layer 34 formed at the upper portion of the semiconductor layer 32 at the region where the source electrode 8 and the drain electrode 12 are isolated is removed in the process of forming the source electrode 8 and the drain electrode 12. The semiconductor layer 32 exposed as the ohmic contact layer 34 is removed becomes a channel region of the thin film transistor.

A passivation layer 38 is formed at the entire surface of the substrate 1 exposed with the source electrode 8 and the drain electrode 12. The passivation layer 38 can be an inorganic insulation film such as SiNx or SiOx, or an organic insulation film such as benzocyclobutene (BCB), a spin-on-glass or acryl with a low dielectric constant in order to improve an aperture ratio of the liquid crystal display device.

The contact hole 16 is formed through the passivation layer 38 to expose a portion of the drain electrode 12. The pixel electrode 14 is formed at an upper portion of the passivation layer 38, and the pixel electrode 14 and the drain electrode 12 electrically contact with each other through the contact hole 16.

FIG. 4 is a sectional view taken along line II-II' of FIG. 2. A sectional structure of the storage capacitor will now be described in detail with reference to FIG. 4.

The storage line 3 is formed on the substrate 1, and the gate insulation film 30 is formed at the entire surface of the substrate 1 including the storage line 3. The storage line 3 is formed isolated from and parallel to the gate line 4 when the gate line 4 is formed. The passivation layer 38 is formed at an upper portion of the gate insulation film 30. The passivation layer 38 is the same layer as the passivation layer 38 of the switching device of FIG. 3. The pixel electrode 14 is formed at an upper portion of the passivation layer 38, overlapping with the storage line 3 at a certain region.

In the case of the storage capacitor as shown in FIGS. 2 and 4, the storage line 3 and the pixel electrode 14 overlap each other with the gate insulation film 30 and the passivation layer 38 therebetween.

A gate drive applies a signal to every gate line, and the channel of the TFT is turned on by the applied gate signal. While the channel of the TFT is turned on, a data signal is applied to the TFT, applying a current to the pixel electrode, according to which an electric field is formed both by the pixel electrode and the common electrode, thereby driving the liquid crystal. The voltage applied to the pixel electrode through the data line forms the storage capacitor together with the storage line positioned at a lower side of the pixel electrode.

The storage capacitor serves to maintain a signal while no signal is applied to the pixel electrode. However, during the fabrication process of the unit pixel, the unit pixel can be defective due to a particle or the like generated during the fabrication, thereby failing to perform a normal driving.

SUMMARY OF THE INVENTION

Therefore, an object of the present invention is to provide a liquid crystal display device adopting a storage-on-common method that is capable of preventing operation of a unit pixel with a point deficiency, such as a brilliant spot, at its occurrence, thereby preventing degradation of a picture quality caused due to the defective pixel. Because the defective pixel is controlled to be in the black state, a picture quality degradation due to the defective pixel is prevented when the liquid crystal display device is driven.

To achieve these and other advantages and in accordance with the purpose of the present invention, as embodied and broadly described herein, there is provided a liquid crystal display device comprising: a plurality of gate lines each having a repair pattern for at least one unit pixel; a plurality of data lines arranged to cross the gate lines; a pixel electrode formed at a unit pixel region defined as one of the gate line and one of the data lines intersect; and a storage line overlapping with the pixel electrode.

According to another aspect of the present invention, there is provided a liquid crystal display device comprising: a plurality of gate lines formed in parallel to each other; a plurality of data lines formed in parallel to each other and crossing the gate lines; a pixel electrode formed at a unit pixel region defined by one of the gate lines and one of the data lines, and having a repair pattern; and a storage electrode overlapping with the pixel electrode.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention is directed to provide a method for removing a defective pixel of a liquid crystal display device using a normally white mode.

The liquid crystal display device can be divided into a normally white mode LCD device and a normally black mode LCD device depending on an initial state of a screen.

The normally white mode liquid crystal display device is a type where if no signal is applied to a unit pixel, light irradiated from a backlight of the liquid crystal display device passes through a liquid crystal layer, showing a bright (white) state. In the normally white mode liquid crystal display device, if no signal is applied to the unit pixel, the pixel shows a white state, whereas, when a signal is applied to the unit pixel, liquid crystal is driven to make the unit pixel black.

The normally black mode liquid crystal display device shows the opposite operation characteristics to the normally white mode liquid crystal display device. That is, if no signal is applied to the unit pixel, light irradiated from the backlight can not pass through a polarizing plate and the liquid crystal layer filled between the color filter substrate and the TFT array substrate, making the pixel black. When a voltage is applied to the black mode liquid crystal display device, liquid crystal is driven to make light pass therethrough, making the pixel white (bright).

Figure 5:
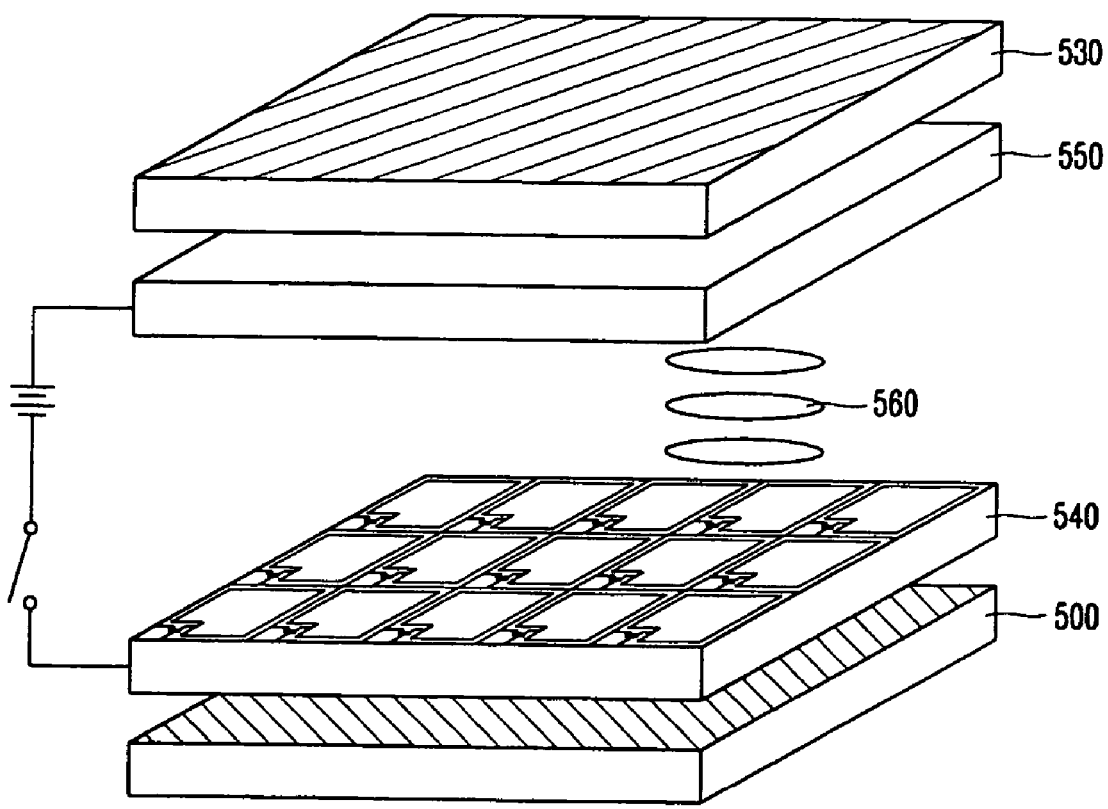
FIG. 5 is a sectional view showing an operation of a liquid crystal panel a liquid crystal display device in accordance with the present invention.

The operation of a normally white mode liquid crystal display device of the present invention will now be described with reference to FIG. 5.

The liquid crystal display device of the present invention includes: a first polarizing plate 500 positioned at one side of a TFT array substrate 540; the TFT array substrate 540 on which a plurality of gate lines and a plurality of data lines intersect and are arranged in a matrix form; a color filter substrate 550 having a color filter layer with different color filters such as red, green and blue color filters corresponding to a unit pixel of the TFT array substrate; a second polarizing plate 530 positioned at one side of the color filter substrate;

and liquid crystal 560 filled between the TFT array substrate 540 and the color filter substrate 530. The color filter substrate 530 has a conventional color filter substrate structure, and the TFT structure of the TFT array substrate 540 has a conventional TFT structure.

Here, the liquid crystal 560 is negative liquid crystal of which a dielectric constant of a long axis is smaller than that of a short axis. The negative liquid crystal has a property that its long axis is arranged in parallel to the direction of an electric field when the electric field is applied thereto. With no electric field applied thereto, the long axis of the liquid crystal is arranged in parallel to the substrate.

The first polarizing plate 500 and the second polarizing plate 530 are arranged such that their polarization directions are perpendicular to each other.

When light is irradiated by the backlight (not shown) existing at one side of the first polarizing plate 500 of the liquid crystal panel, the irradiated light is polarized by the first polarizing plate 500 and passes through the liquid crystal layer 560 to reach the second polarizing plate 530.

At this time, if the liquid crystal (i.e., liquid crystal molecules) is oriented parallel to the polarizing plates 500 and 530, the liquid crystal generates a phase difference for the polarized light to make the light, which has passed through the first polarizing plate 500, pass through the second polarizing plate 530. If, however, the liquid crystal is oriented in a vertical direction to the polarizing plates 500 and 530 (e.g., by the application of an electric field), the liquid crystal would not generate a phase difference for the light, so that the light which has passed through the first polarizing plate 500 is blocked by the second polarizing plate 530, showing a black state.

The degree on how much the phase difference occurs changes from 0 to 180 degree depending on the angle between the horizontal arrangement and vertical arrangement of the liquid crystal.

Figure 6:
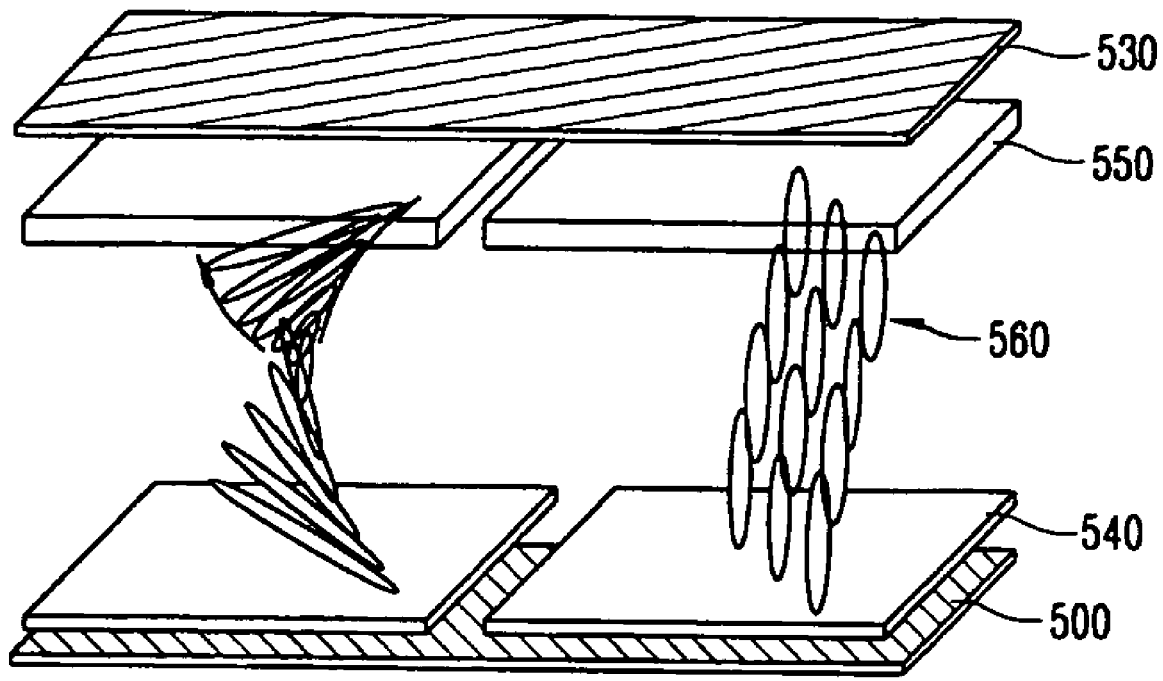
FIG. 6 is a schematic view showing an operation of a TN (Twisted Nematic) mode liquid crystal display device in accordance with the present invention.

As shown in FIG. 6, the liquid crystal display device of the present invention has a TN (Twisted Nematic) mode in which the liquid crystal is twisted depending on the application of an electric field across the liquid crystal.

Referring to FIG. 6, when no voltage is applied across the liquid crystal 560, the liquid crystal is oriented horizontally (or twisted) such that a polarized light from the TFT array substrate 540 passes through the liquid crystal 560 and the second polarizing plate 530. Meanwhile, if the liquid crystal is oriented vertically as the electric field is applied thereto, the polarized light passes through the liquid crystal 560 without a phase difference, and fails to pass through the second polarizing plate 530.

Driving of the liquid crystal is made by applying an electric field between the pixel electrode on the TFT array substrate and the common electrode positioned on the color filter substrate.

When a voltage is applied to the gate electrode of the TFT through the gate line, the channel layer of the TFT is turned on, and at this time, a voltage signal originated from the data line is applied to the pixel electrode through the channel layer. Then, an electric field is formed between the pixel electrode and the common electrode on the color filter substrate to which a voltage has been applied through a different path.

The rotation degree of the liquid crystal varies depending on the strength of the electric field.

In the present invention, about 3 volt of voltage is applied to the common electrode, and a maximum 5 volt of voltage is applied to the pixel electrode through the data line. The liquid crystal is arranged perpendicular to the electric field according to 2 volt of voltage difference between the common electrode and the pixel electrode.

Figure 1:
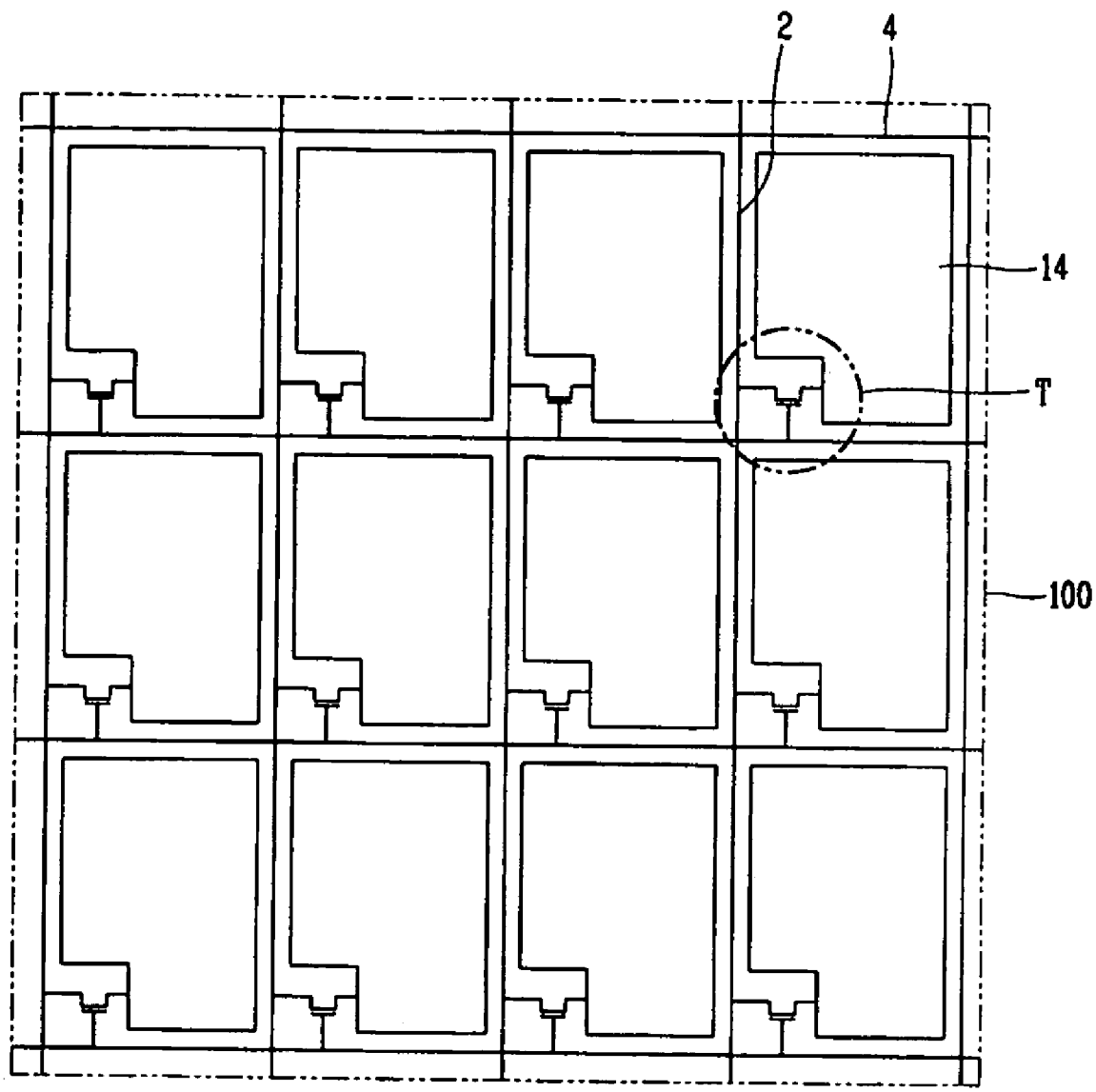
FIG. 1 is a plane view showing a TFT array substrate of a liquid crystal display device in accordance with the related art.
Figure 2:
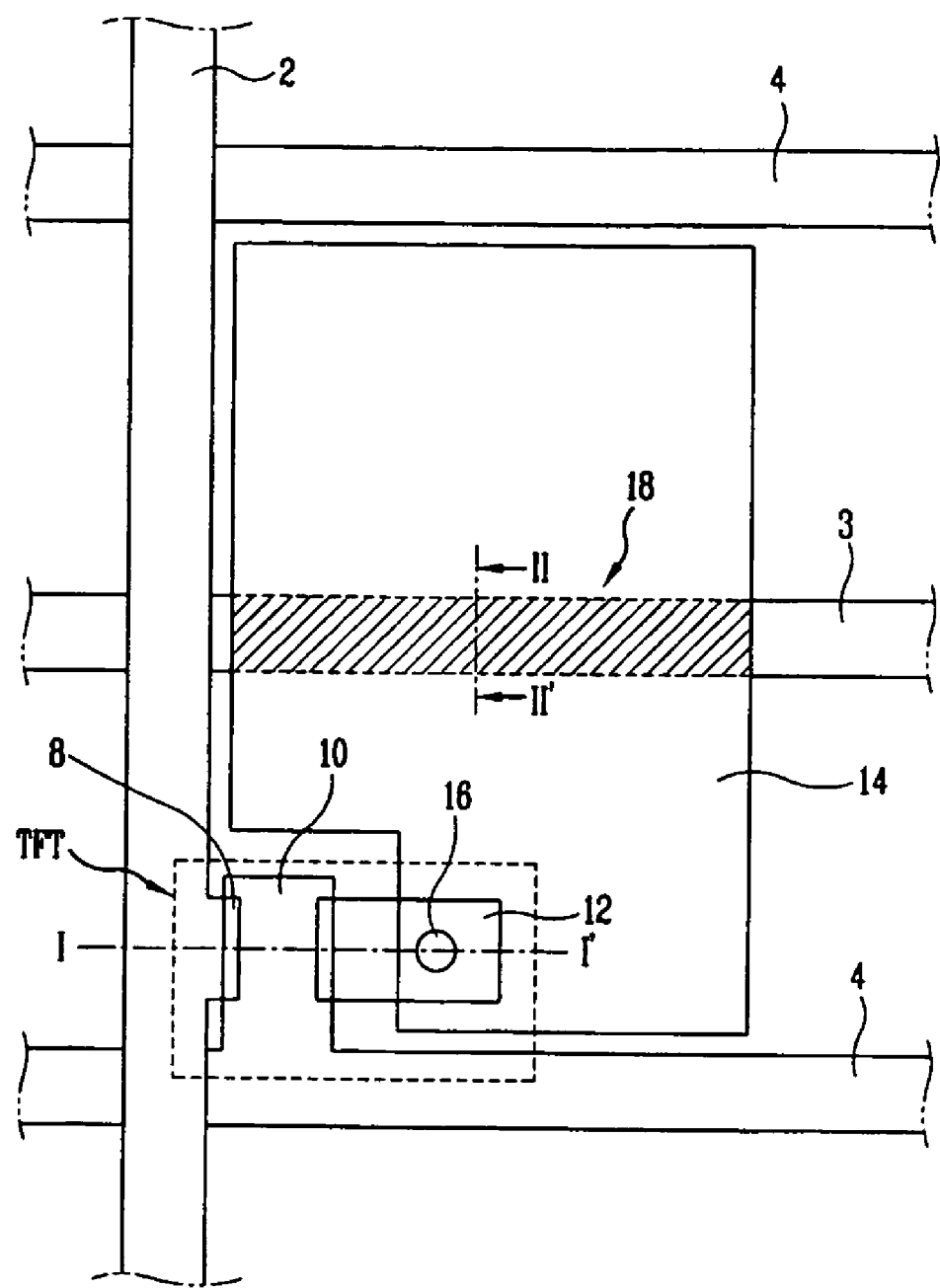
FIG. 2 is a sectional view showing a unit pixel in the TFT array substrate with a storage-on-common structure in accordance with the related art.
Figure 3:
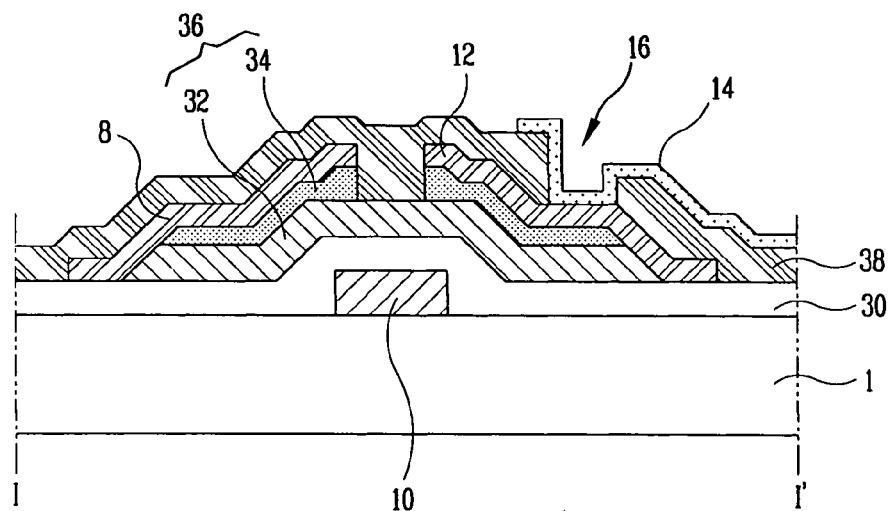
FIG. 3 is a sectional view of the storage-on-common type thin film transistor, along line I-I' of FIG. 2, in accordance with the related art.
Figure 4:
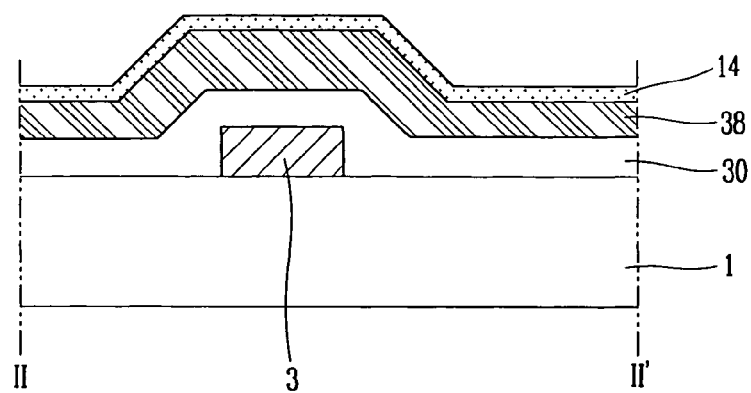
FIG. 4 is a sectional view showing a storage capacitor of the storage-on-common type thin film transistor, along line II-II' of FIG. 2, in accordance with the related art.
Figure 7:
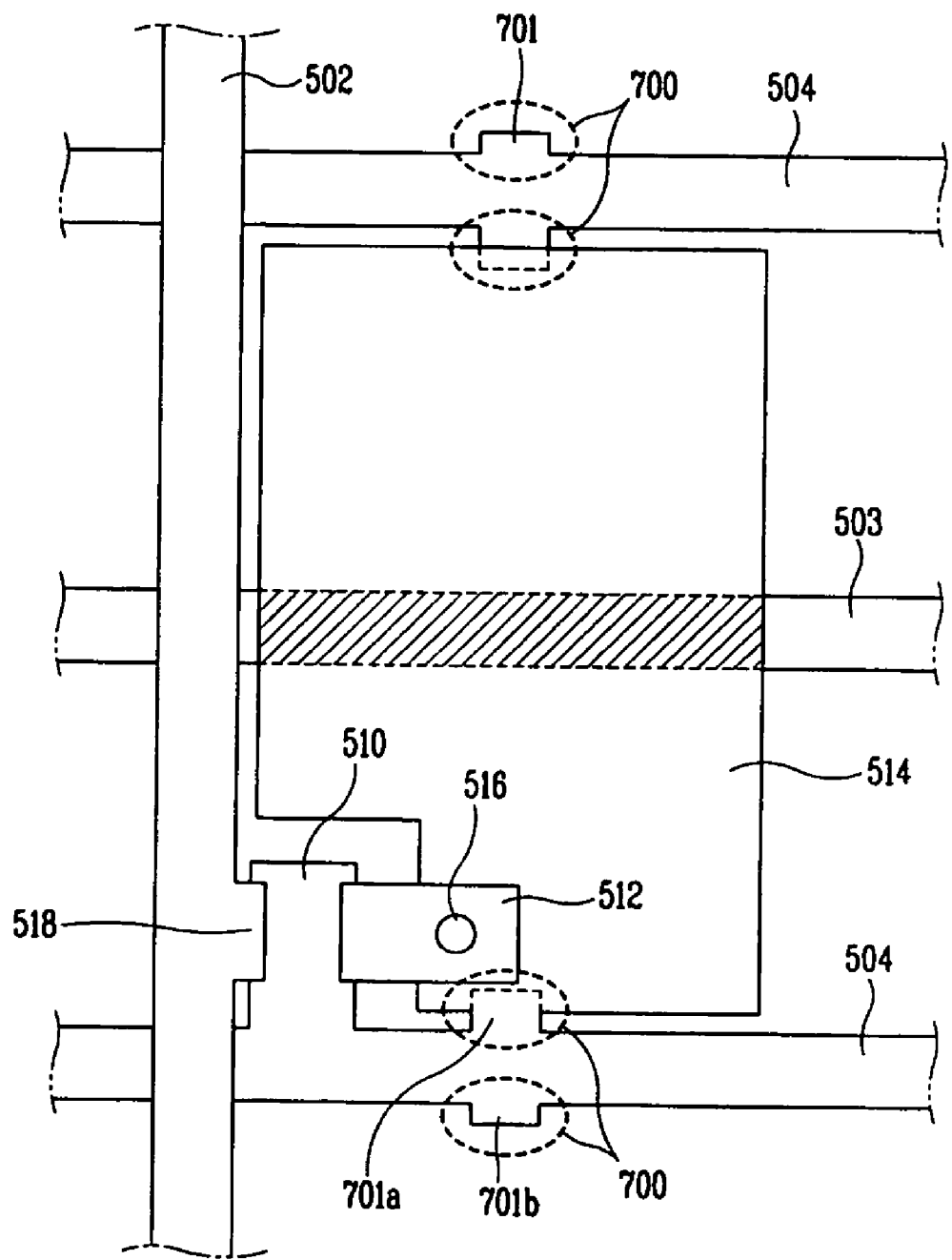
FIG. 7 is a sectional view showing a structure of a unit pixel in a TFT array substrate of the liquid crystal display device in accordance with one embodiment of the present invention.

FIG. 7 shows one example of a structure of a data line 502 and a gate line 504 having a redundancy repair pattern 700 overlapping with a pixel electrode 514 formed on the TFT array substrate 540 of the liquid crystal display device of the present invention. The structure and operation of the LCD device of FIG. 7 is identical to that of the LCD device of FIGS. 1-3, except for the structure and operation pertaining to the redundancy repair pattern 700.

With reference to FIG. 7, the redundancy repair pattern 700 formed at each gate line 504 may have one or more protrusions 701 at every unit pixel. The redundancy repair pattern 700 may have one or more protrusions 701 at both sides of each gate line for each unit pixel. Because the redundancy repair pattern 700 extends directly from the gate line, a portion of the pixel electrode 514 is now located above the redundancy repair pattern 700 with an insulating layer and any other layer(s) of the TFT structure provided between the redundancy repair pattern 700 and the overlapping portion of the pixel electrode 514.

The TFT array substrate 540 includes a plurality of TFTs each formed at an intersection of the corresponding data line 502 and the corresponding gate line 504. Each TFT includes a gate electrode 510, a source electrode 518, and a drain electrode 512, all operatively formed. The drain electrode 512 is electrically connected to the corresponding pixel electrode 514 through a contact hole 516. In this matter, the structure of the TFT in FIG. 7 is identical to the TFT structure of FIG. 3. The substrate 540 also includes a storage line 503.

In the present invention, if a pixel electrode becomes defective due to various particles generated during a fabrication process of the liquid crystal display device, then a laser beam is applied to the overlapping portion of the defective pixel electrode so as to electrically connect the defective pixel electrode and the corresponding redundancy repair pattern by welding, whereby the gate voltage applied to the corresponding gate line is also applied to the pixel electrode via the repair pattern.

For example, in the normally white mode TFT array substrate of the LCD device according to the present invention as shown in FIG. 7, first, a gate voltage is applied to the gate electrode 510. The gate voltage is also applied to the pixel electrode 514 via the redundancy repair pattern 700 now electrically connected to the pixel electrode 514.

The voltage applied to the pixel electrode 514 is a gate voltage of about 20 V. Now, the gate voltage, which has been applied to the defective pixel electrode 514, applies an electric field to the liquid crystal together with the common electrode formed on the color filter substrate, so that the liquid crystal is arranged in parallel to the direction of the electric field (that is, vertically). As a result, when the gate and data signals are applied to the switching device (TFTs) of the liquid crystal display device, a light irradiated from the backlight positioned at a lower side of the first polarizing plate 500 cannot pass through the second polarizing plate 530 and the defective pixel(s) turn black to enter the 'black' state. In other words, for each defective pixel unit, when the gate signal is applied to the gate line, the gate signal is also applied to the defective pixel electrode through the gate redundancy repair pattern electrically connected to the defective pixel electrode, which then applies an electric field across the liquid crystal together with the common electrode formed on the color filter substrate, so that the liquid crystal is constantly oriented vertically.

Accordingly, when the gate redundancy repair pattern and the defective pixel electrode are welded, the unit pixel turns and remains black, which prevents formation of a brilliant spot at the defective pixel electrode and which prevents a deterioration of the picture quality of the LCD device due to the brilliant spot or point deficiency. In this regard, the laser beam can be selectively applied to one or more applicable protrusions 701. For instance, if two protrusions 701a and 701b extend in the opposite directions from a gate line 504 as shown in FIG. 7 and only one pixel electrode 514 is defective, then only the first protrusion 701a can be welded by the laser beam. If the two adjacent pixel electrodes are defective, then both the first and second protrusions 701a and 701b can be welded by the laser beam to turn both pixel electrodes black using only one gate line. Similarly, by welding protrusions of the repair pattern corresponding to all the defective pixel electrodes selectively or simultaneously (if possible), then the defective pixel electrodes can turn black more efficiently.

In the present invention, when the gate voltage is applied to the gate line, the applied gate voltage is applied to the pixel electrode via the welded redundancy repair pattern, and the pixel electrode and the storage line maintain an equivalent electric potential by being electrically connected to the common electrode of the color filter substrate.

The gate signal is sequentially applied to the next gate line. At this time, the TFT, which has received the gate signal, will no longer receive the gate signal. In this respect, however, the TFT needs to store the gate signal until it receives the next gate signal. And the capacitor formed in the pixel electrode region performs this necessary function.

As the gate voltage is applied to the pixel electrode, the pixel electrode has a potential of 20V, while the storage line has a potential of 3V because it is the equipotential to the common electrode. Accordingly, the capacitor is charged with the difference potential of 17V. If no voltage is applied to the pixel electrode as the application of the gate signal has been moved to the next gate line, the electric field between the pixel electrode and the common electrode is maintained by the voltage charged in the capacitor.

Since the gate line and the pixel electrode become electrically connected to each other through the redundancy pattern, even if a data signal is transmitted to the pixel from the data line, the pixel may not display it. That is, the data signal has a voltage of 0~5V, which is not significant for the pixel electrode to which the voltage has been already applied by the gate line.

Owing to the difference voltage of 2V between the voltage (e.g., 5V) applied from the data line and the common electrode voltage, the liquid crystal is usually oriented vertically. Thus, when the gate line and the pixel electrode become electrically connected as in the present invention, a voltage of 14~17V is constantly applied to the liquid crystal, so that the liquid crystal is oriented and maintained vertically and the pixel becomes and is maintained in the black state.

Figure 8:
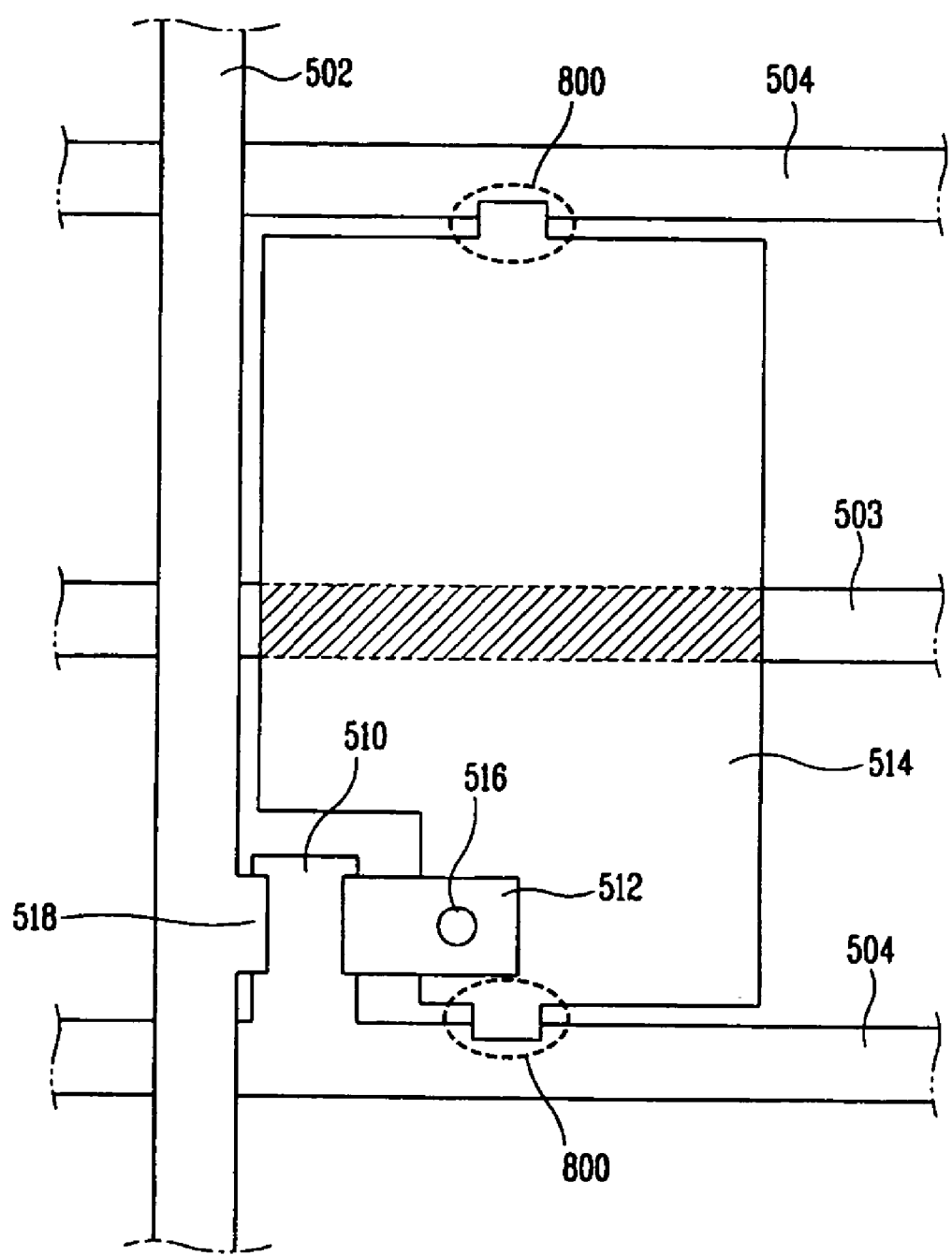
FIG. 8 is a sectional view showing a structure of a unit pixel in a TFT array substrate of the liquid crystal display device in accordance with another embodiment of the present invention.

FIG. 8 is a sectional view showing a structure of a unit pixel in the TFT array substrate 540 of the liquid crystal display device in accordance with another embodiment of the present invention.

The LCD device of FIG. 8 is identical to the LCD device of FIG. 7, except for the location of the redundancy repair pattern. Although, as an example, FIG. 8 shows one protrusion of a redundancy repair pattern 800 formed at each of two opposite sides of each pixel electrode 514, multiple protrusions may be formed at each of the opposite sides of the pixel electrode 514. The operation of the repair pattern 800 is the same as the redundancy repair pattern 700 of FIG. 7, in that the defective pixel electrode 514 becomes electrically connected to the corresponding gate line 504 by applying heat such as a laser light to the corresponding redundancy repair pattern 800. Consequently, the defective pixel electrode 514 turns black and remains black and does not interfere with the normal operation of the LCD device. The welding of the repair patterns 800 can be selectively made depending on which pixel electrode should turn black and the configuration of the LCD device.

In the examples of FIGS. 7 and 8, the redundancy repair patterns 700, 800 are provided with rectangularly shaped protrusions centrally located with respect to the side edge(s) of the corresponding pixel electrode 514. However, the present invention encompasses different shapes and/or locations of protrusions for the redundancy repair patterns.

Also, although a laser light may be used to weld or electrically connect a pixel electrode and a corresponding gate line via a redundancy repair pattern, the present invention encompasses the use of other means to electrically connect the pixel electrode and the gate line via the redundancy repair pattern. For instance, other types of heat generating elements may be used.

As so far described, the liquid crystal display device having the gate line(s) or the pixel electrode(s) with the redundancy repair pattern(s) of the present invention has the following advantages.

When a point defect occurs at a unit pixel, the pixel electrode and the gate line are electrically connected via the repair pattern to successively apply a voltage to the defective pixel to orient the liquid crystal parallel to the direction of the electric field to make the defective pixel black. This prevents degradation in the picture quality caused due to the defective pixel when the LCD device is driven.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A liquid crystal display device comprising:
   a plurality of gate lines each having a repair pattern for at least one unit pixel;
   a plurality of data lines arranged to cross the gate lines;
   a pixel electrode formed at a unit pixel region defined as one of the gate line and one of the data lines intersect;
   a storage line overlapping with the pixel electrode; and
   wherein the repair pattern includes protrusions extending in opposite directions from a portion of the gate line, so as to be formed under two adjacent pixel electrodes.

2. The device of claim 1, wherein the repair pattern electrically connects the corresponding gate line and pixel electrode when the corresponding gate line and pixel electrode are welded to each other via the repair pattern.

3. The device of claim 1, wherein the device has a normally white mode.

4. The device of claim 1, wherein the device has is a storage-on-common type.

5. The device of claim 1, further comprising:
a thin film transfer for each unit pixel.

6. A redundancy repair pattern structure usable in a display device, the device including a plurality of gate lines and data lines crossing each other, a plurality of pixel electrodes each at an intersection of the corresponding gate and data lines, and a plurality of storage lines parallel to the gate lines, the structure comprising:
a redundancy repair pattern extending from each of the gate lines and formed under a pixel electrode; and
wherein the repair pattern includes protrusions extending in opposite directions from a portion of the gate line, so as to be formed under two adjacent pixel electrodes.

7. The redundancy repair pattern structure of claim 6, wherein the repair pattern electrically connects the corresponding gate line and pixel electrode when the corresponding gate line and pixel electrode are welded to each other via the repair pattern.

8. A method for providing a liquid crystal display device, the method comprising:
forming a gate line having a repair pattern including protrusions extending in opposite directions from a portion of the gate line on a substrate;
forming a gate insulation film, a semiconductor layer and a conductive layer on the substrate;
forming source/drain electrodes;
forming a passivation layer on the source/drain electrodes; and
forming a pixel electrode on the passivation layer such that the pixel electrode overlaps with the repair pattern.

9. The method of claim 8, wherein the pixel electrode and the gate line are electrically connected to each other by irradiating a beam to the repair pattern.

* * * * *